United States Patent
Urano et al.

(10) Patent No.: US 8,578,909 B2
(45) Date of Patent: Nov. 12, 2013

(54) CONTROL DEVICE FOR INTERNAL COMBUSTION ENGINE

(75) Inventors: Shigeyuki Urano, Susono (JP); Yoshihiro Sakayanagi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/257,753

(22) PCT Filed: Nov. 12, 2010

(86) PCT No.: PCT/JP2010/070217
§ 371 (c)(1),
(2), (4) Date: Sep. 20, 2011

(87) PCT Pub. No.: WO2012/063363
PCT Pub. Date: May 18, 2012

(65) Prior Publication Data
US 2013/0226434 A1    Aug. 29, 2013

(51) Int. Cl.
*F02M 1/00* (2006.01)
(52) U.S. Cl.
USPC .......................................... 123/434; 123/435
(58) Field of Classification Search
USPC ................... 123/396, 436, 434, 435
See application file for complete search history.

(56) References Cited

U.S. PATENT DOCUMENTS

| | | | |
|---|---|---|---|
| 6,948,478 B2 * | 9/2005 | Fuwa et al. | 123/435 |
| 7,066,146 B2 * | 6/2006 | Fuwa et al. | 123/406.55 |
| 7,107,975 B2 * | 9/2006 | Fuwa et al. | 123/568.14 |
| 7,201,139 B2 * | 4/2007 | Fuwa et al. | 123/306 |
| 2008/0319633 A1 | 12/2008 | Moriya et al. | |

FOREIGN PATENT DOCUMENTS

| | | |
|---|---|---|
| JP | A-07-332149 | 12/1995 |
| JP | A-2005-351146 | 12/2005 |
| JP | A-2007-146785 | 6/2007 |

OTHER PUBLICATIONS

International Search Report issued in Application No. PCT/JP2010/070217; Dated Dec. 7, 2010 (With Translation).

* cited by examiner

*Primary Examiner* — John Kwon
(74) *Attorney, Agent, or Firm* — Oliff & Berridge, PLC

(57) ABSTRACT

A control device for an internal combustion engine. An object of the present invention is to provide a control device for an international combustion engine for highly accurate absolute pressure correction irrespective of the length of an adiabatic compression stroke period. When the number of cylinders in an engine is n (n is an integer of 2 or more), an adiabatic compression stroke period of one cylinder preceding another cylinder to be corrected into its absolute pressure by a 1/n cycle (ignition timing —IVC) is compared with a threshold $CA_{TH}$ (step 100). In the step 100, the absolute pressure correction is carried out based on $PV^\kappa$=constant when the adiabatic compression stroke period is longer than the threshold $CA_{TH}$ (step 110). On the other hand, the absolute pressure correction is carried out based on a value $P_{IP}$ detected by an intake pipe pressure sensor when the adiabatic compression stroke period is shorter than the threshold $CA_{TH}$.

6 Claims, 6 Drawing Sheets

CONTROL DEVICE FOR INTERNAL COMBUSTION ENGINE

TECHNICAL FIELD

The present invention relates to a control device for an internal combustion engine. More specifically, the present invention relates to a control device for an internal combustion engine for executing various kinds of controls using in-cylinder pressure.

BACKGROUND ART

Patent Literature 1, for example, discloses a control device for an internal combustion engine for calculating an intake air amount using a value obtained by correcting a value detected by an in-cylinder pressure sensor (hereinafter referred to as CPS) to its absolute pressure when an ignition timing for in-cylinder mixture is determined. The value detected by the CPS is a relative pressure, and therefore the value needs to be corrected to an absolute pressure in order to accurately obtain the intake air amount. An adiabatic process is conducted after an intake valve is closed and before the in-cylinder mixture is ignited in a compression stroke of the internal combustion engine. The control device calculates an in-cylinder pressure correction value by the following equation (1) using Poisson's equation established during the adiabatic process in order to correct the value to the absolute pressure.

$$\text{In-cylinder pressure correction value} = (P_b V_b^\kappa - P_a V_a^\kappa)/(V_a^\kappa - V_b^\kappa) \quad (1)$$

(where $P_a$ and $P_b$ are values detected by the CPS within the adiabatic compression stroke period after the intake valve is closed and before the in-cylinder mixture is ignited, $V_a$ and $V_b$ are in-cylinder (combustion chamber) volumes when $P_a$ and $P_b$ are detected, and $\kappa$ is a specific heat ratio.)

CITATION LIST

Patent Literature

Patent Literature 1: Japanese Patent Laid-Open No. 2007-146785

SUMMARY OF INVENTION

Technical Problem

To use the above equation (1) for calculating the in-cylinder pressure correction value, two values $P_a$ and $P_b$ detected by the CPS during the adiabatic compression stroke period are necessary. Therefore, for example, when the intake valve is controlled to be closed late, $P_a$ and $P_b$ acquired during a short adiabatic compression stroke period are used and thus a difference between the in-cylinder volumes $V_a$ and $V_b$ when $P_a$ and $P_b$ are detected is extremely small. In other words, the denominator of the equation (1) is close to zero and thus there is a variation in the in-cylinder pressure correction value. Thus, when the adiabatic compression stroke period is short, the accuracy of absolute pressure correction may be reduced.

The present invention is made to solve the above-described problem. An object of the present invention is to provide a control device for an internal combustion engine for highly accurate absolute pressure correction irrespective of the length of an adiabatic compression stroke period.

Means for Solving the Problem

To achieve the above mentioned purpose, a first aspect of the present invention is a control device for an internal combustion engine comprising:

intake pipe pressure acquiring means for acquiring an intake pipe pressure of the internal combustion engine;

in-cylinder pressure acquiring means for acquiring an in-cylinder pressure of the internal combustion engine;

first corrected value calculating means for acquiring in-cylinder pressures at least twice every required period after an intake valve of a cylinder of the internal combustion engine is closed and before mixture in the cylinder is ignited by ignition means of the cylinder while acquiring in-cylinder volumes during acquisition of the in-cylinder pressures, and calculating a first corrected value using the acquired in-cylinder pressures, the in-cylinder volumes, and a specific heat ratio;

second corrected value calculating means for calculating a second corrected value using the in-cylinder pressure and the intake pipe pressure acquired when the intake valve is opened;

comparing means for comparing the required period with a set period determined in advance; and in-cylinder pressure correcting means for correcting the in-cylinder pressures acquired within the required period using the first corrected value when the required period is longer than the set period, and correcting the in-cylinder pressures acquired within the required period using the second corrected value when the required period is shorter than the set period.

A second aspect of the present invention is the control device for an internal combustion engine according to the first aspect, further comprising:

first mode value calculating means for calculating a first frequency distribution from data of the first corrected value calculated every predetermined timing within the required period when the required period is longer than the set period, and calculating a mode value of the first frequency distribution as a first mode value;

second mode value calculating means for calculating a second frequency distribution from data of the second corrected value calculated the every predetermined timing and calculating a mode value of the second frequency distribution as a second mode value; and mode value deviation calculating means for calculating a deviation between the first mode value and the second mode value as a mode value deviation, wherein the in-cylinder pressures acquired within the required period are corrected by the in-cylinder pressure correcting unit using the second corrected value and the mode value deviation when the required period is shorter than the set period.

A third aspect of the present invention is the fuel control device for an internal combustion engine according to the first or the second aspect, further comprising:

first standard deviation calculating means for calculating a standard deviation of the first frequency distribution as a first standard deviation;

second standard deviation calculating means for calculating a standard deviation of the second frequency distribution as a second standard deviation;

deviation of standard deviations calculating means for calculating a deviation between the first standard deviation and the second standard deviation as a deviation of standard deviations; and set period correcting means for correcting the set period using the deviation of standard deviations.

Advantageous Effects of Invention

According to the first aspect of the invention, the required period and the set period can be compared with each other before the in-cylinder pressures acquired within the required period are corrected. The first corrected value is used when the required period is longer than the set period, and the second corrected value is used when the required period is shorter than the set period. Since correction can be made using the second corrected value when the required period is shorter than the set period, the reduction in accuracy of correcting the in-cylinder pressures can be prevented even when the adiabatic compression stroke period is short. Thus, the in-cylinder pressures can be accurately corrected irrespective of the length of the adiabatic compression stroke period.

Since a lot of input information is required for calculating the second corrected value as compared when the first corrected value is calculated, the calculating accuracy is easily reduced, for example, by deterioration with the lapse of time. On the other hand, the accuracy of calculating the first corrected value is high when the required period is longer than the set period. Since the first corrected value can be calculated every predetermined timing within the required period according to the second aspect of the invention, the first corrected value can be highly accurately obtained. Accordingly, the first mode value of the first frequency distribution calculated from each data of the first corrected value is highly accurate. Therefore, by using the deviation between the first mode value and the second mode value obtained simultaneously with the first mode value, the reduction in the second corrected value during correction of the in-cylinder pressures can be compensated. Thus, the accuracy of calculating the in-cylinder pressures can be maintained.

Since a lot of input information is required for calculating the second corrected value as compared when the first corrected value is calculated, the calculating accuracy is easily reduced as described above. Thus, the set period may be changed from an originally-set period. The accuracy of calculating the first corrected value is high when the required period is longer than the set period as described above. According to the third aspect of the invention, the first corrected value can be calculated every predetermined timing within the required period. Accordingly, the first corrected value can be highly accurately obtained. Therefore, the first standard deviation of the first frequency distribution calculated from each data of the first corrected value is highly accurate. Thus, by using the deviation between the first standard deviation and the second standard deviation obtained simultaneously with the first standard deviation, the change in the set period can be compensated and therefore the accuracy of calculating the in-cylinder pressures can be maintained.

Figure 1:
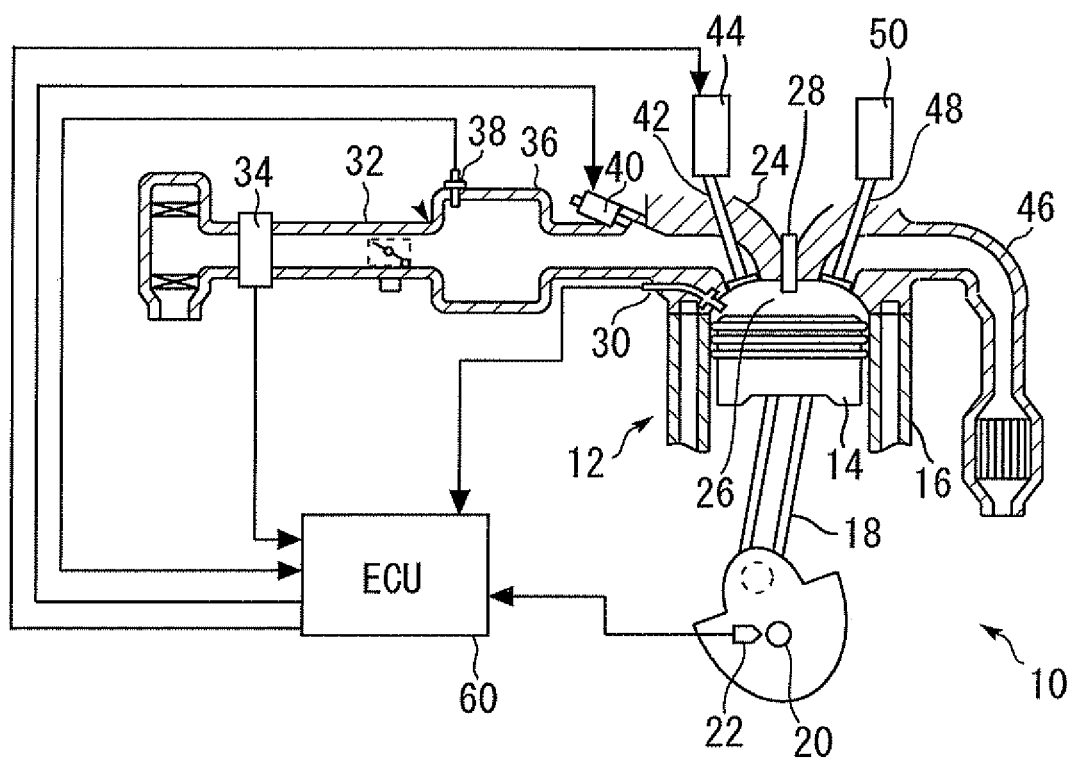
FIG. 1 is an illustration for explaining a system structure according to the first embodiment of the present invention.

DESCRIPTION OF REFERENCE NUMERALS 10 engine
30 in-cylinder pressure sensor
38 intake pipe pressure sensor
60 ECU

DESCRIPTION OF EMBODIMENTS

First Embodiment

[Description of System Structure]

A first embodiment of the present invention will be explained below with reference to FIGS. 1 to 5. FIG. 1 is an illustration for explaining a system structure according to the first embodiment of the present invention. A system according to the first embodiment includes an engine 10 serving as an internal combustion engine. Although the engine 10 includes a plurality of cylinders 12, only one cylinder of the cylinders is illustrated in FIG. 1.

The engine 10 includes a cylinder block 16 accommodating a piston 14 therein. The piston 14 is connected to crankshaft 20 via a connecting rod 18. A crank angle sensor 22 is provided in the vicinity of the crankshaft 20. The crank angle sensor 22 is adapted to detect a rotational angle (crank angle CA) of the crankshaft 20.

A cylinder head 24 is incorporated into an upper portion of the cylinder block 16. A space extending from an upper surface of the piston 14 to the cylinder head 24 forms a combustion chamber 26. The cylinder head 24 is provided with an ignition plug 28 for igniting mixture in the combustion chamber 26. The cylinder head 24 is also provided with a CPS 30 for detecting a pressure (in-cylinder pressure) of the combustion chamber 26.

The cylinder head 24 includes an intake pipe 32 communicated with the combustion chamber 26. An air flowmeter 34 for detecting an intake air amount is provided upstream of the intake pipe 32. A surge tank 36 is provided downstream of the air flowmeter 34. The surge tank 36 provides a widened space having a certain size in the intake pipe 32 for exhibiting damping effect of intake pulsation. An intake pipe pressure sensor 38 for detecting a pressure (intake pipe pressure) in the surge tank 36 is provided in the vicinity of the surge tank 36. A fuel injection valve 40 for injecting fuel to an intake port of the engine 10 is provided further downstream of the surge tank 36.

An intake valve 42 is provided on a connecting portion between the intake pipe 32 and the combustion chamber 26. The intake valve 42 is connected to a variable valve mechanism 44. The variable valve mechanism 44 advances and retards a phase (opening timing and closing timing) of the intake valve 42 in accordance with a command signal inputted from a later-described ECU 60.

The cylinder head 24 includes an exhaust pipe 46 communicated with the combustion chamber 26. An exhaust valve 48 is provided on a connecting portion between the exhaust pipe 46 and the combustion chamber 26. The exhaust valve 48 is connected to the variable valve mechanism 50. The variable valve mechanism 50 advances and retards a phase (opening timing and closing timing) of the exhaust valve 48 in accordance with a command signal inputted from the later-described ECU 60.

Further, the system according to this embodiment includes the ECU (Electronic Control Unit) 60. An input side of the ECU 60 is connected to the above-described crank angle sensor 22, air flowmeter 34, CPS 30, intake pipe pressure sensor 38, and other sensors required for controlling an operating condition of the engine 10 such as an air-fuel ratio sensor for detecting an air-fuel ratio and an accelerator opening degree sensor for detecting an accelerator opening degree.

On the other hand, an output side of the ECU 60 is connected to the ignition plug 28, the fuel injection valve 40, and various actuators including the variable valve mechanisms 44 and 50. The ECU 60 controls the operating condition of the engine 10 by detecting operating information of the engine 10 using the above-described various sensors in real time and driving each actuator based on a detection result.

[Characteristics of First Embodiment]

When a value detected by the CPS 30 is used as a control parameter for various controls of the engine 10 using the ECU 60 and the value is incorrectly converted to its absolute pressure information, the control accuracy is reduced. In addition, emission, drivability, and the like are also reduced. To solve this problem, Patent Literature 1 discloses a converting method as described above.

Figure 2:
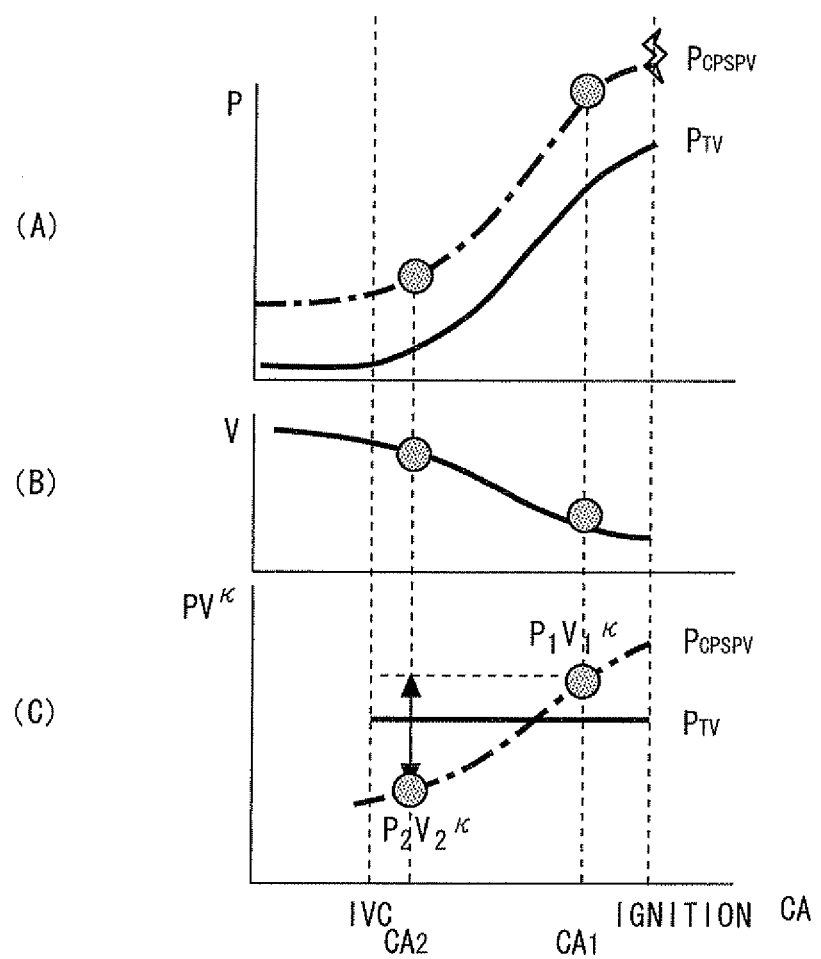
FIG. 2 shows the changes of (A) in-cylinder pressure P, (B) in-cylinder (combustion chamber 26) volume V, and (C) product of them $PV^\kappa$ ($\kappa$ is a specific heat ratio) in the compression stroke of the engine 10.

The converting method disclosed in Patent Literature 1 and its problem will be described in detail with reference to FIGS. 2 and 3. FIG. 2 shows the changes of (A) in-cylinder pressure P, (B) in-cylinder (combustion chamber 26) volume V, and (C) product of them $PV^\kappa$ ($\kappa$ is a specific heat ratio) in the compression stroke of the engine 10. Incidentally, FIG. 2 is illustrated on the condition that the intake valve 42 is closed after an intake bottom dead center.

As shown in FIG. 2(A) and FIG. 2(B), the in-cylinder pressure P is increased with the ascent of the piston 14 and the in-cylinder volume V is decreased with the ascent of the piston 14 after the intake valve 42 is closed (IVC). The CPS 30 detects a relative pressure with reference to an intake pipe pressure. Accordingly, a detected value $P_{CPSDV}$ (dashed line) is different from a true pressure value $P_{TV}$ (solid line) as shown in FIG. 1(A). Thus, the ECU 60 corrects the detected value $P_{CPSDV}$ into its absolute pressure by excluding an error Pr corresponding to the difference and uses a corrected value $P_{CV} (=P_{TV})$ after absolute pressure correction.

Here, the detected value $P_{CPSDV}$ cannot be corrected into its absolute pressure without the intake pipe pressure sensor 38. Therefore, in the above-described converting method, an error Pr is calculated based on the corrected value $P_{CV}$ obtained by adding the detected value $P_{CPSDV}$ to the error Pr ($P_{CV}=P_{CPSDV}+Pr$) and Poisson's equation ($PV^\kappa$=constant: solid line in FIG. 2 (C)) established when the compression stroke after the intake valve 42 is closed and before the in-cylinder mixture is ignited is provided as an adiabatic process (equation 2 below).

$$Pr=(P_2 V_2^\kappa - P_1 V_1^\kappa)/(V_1^\kappa - V_2^\kappa) \quad (2)$$

(in the above equation (2), $P_1$ and $P_2$ are arbitrary values detected by the CPS 30 during the adiabatic compression stroke period after the intake valve 42 is closed and before the in-cylinder mixture is ignited, $V_1$ and $V_2$ are in-cylinder volumes when $P_1$ and $P_2$ are detected, and $\kappa$ is a specific heat ratio.)

By using the above equation (2), the detected value $P_{CPSDV}$ can be corrected to its absolute pressure even without the intake pipe pressure sensor 38. When the number of cylinders in the engine 10 is n (n is an integer of 2 or more hereinbelow) and the intake valves 42 of the cylinders are uniformly phase-controlled, an adiabatic compression stroke period for one cylinder 12 to be corrected to its absolute pressure is almost the same as an adiabatic compression stroke period of another cylinder 12 preceding the one cylinder 12 by a 1/n cycle (720°/n). Thus, the detected value $P_{CPSDV}$ of the cylinder 12 preceding $P_1$ and $P_2$ by the 1/n cycle is used for the equation (2), so that the error Pr of the cylinder 12 to be corrected to its absolute pressure can be accurately estimated.

Here, crank angles when $P_1$ and $P_2$ are detected are denoted as $CA_1$ and $CA_2$ ($CA_2<CA_1$), respectively. It is preferable that $CA_1$ be set as close to an ignition timing of in-cylinder mixture as possible and $CA_2$ be set as later than a closing timing of the intake valve 42 as possible. When $CA_1$ is the detecting timing, the error Pr can be accurately obtained because the detected value $P_{CPSDV}$ can be high. When $CA_2$ is the detecting timing, the detected value $P_{CPSDV}$ can be obtained while a condition of air flow within the combustion chamber 26 is stable.

Incidentally, an Atkinson cycle is suggested as a system for improving fuel consumption of the engine 10. The Atkinson cycle is a system for effectively using thermal energy by setting an expansion ratio to be larger than a compression ratio and reducing pump loss. When such a system is applied to the system according to this embodiment, the closing timing of the intake valve 42 may be changed by the variable valve mechanism 44 to a retard angle side of the intake bottom dead center.

An actual compression ratio can be reduced by changing the closing timing of the intake valve 42 to the retard angle side of the intake bottom dead center. However, when the actual compression ratio is reduced, a knocking limit at an optimum ignition timing is offset to the advance angle side. Then, the period after the intake valve 42 is closed and until the in-cylinder mixture is ignited is shortened. When $P_1$ and $P_2$ are obtained as preferable detecting timings under such a situation, a detection interval between $P_1$ and $P_2$ is extremely narrowed.

Figure 3:
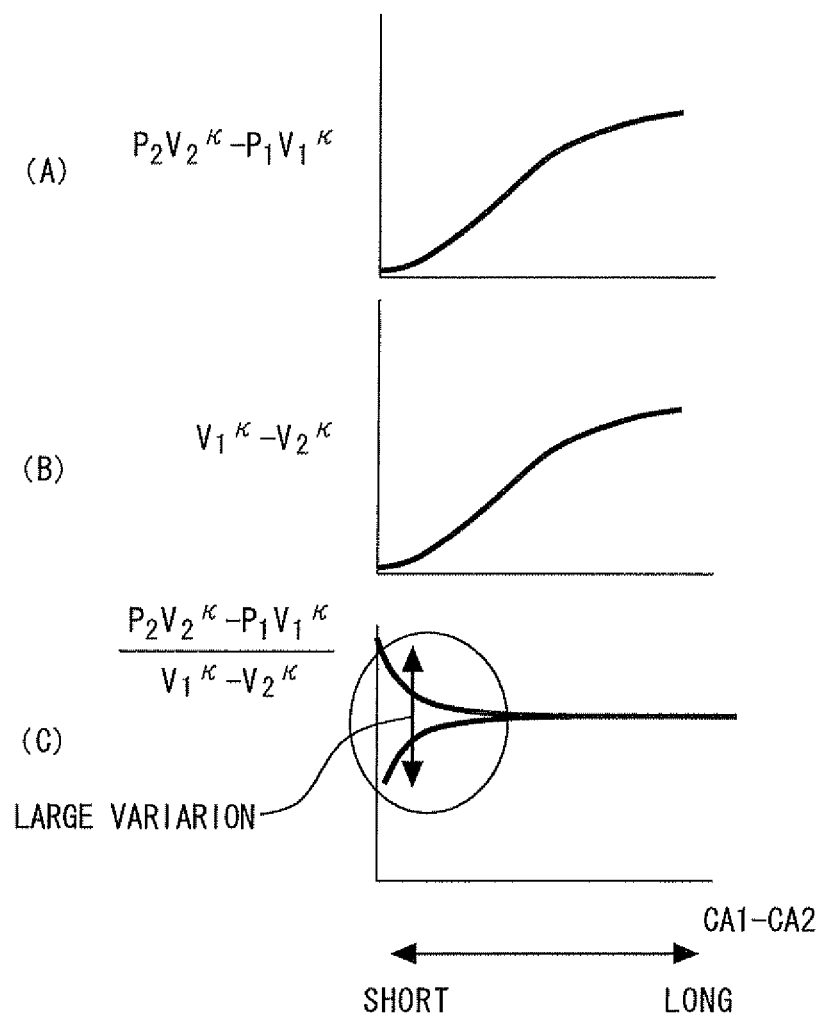
FIG. 3 shows a relationship between the detection interval between $P_1$ and $P_2$ and the right side of the equation (2).

FIG. 3 shows a relationship between the detection interval between $P_1$ and $P_2$ and the right side of the equation (2). When the detection interval ($CA_1-CA_2$) is sufficiently long, both values $P_2 V_2^\kappa - P_1 V_1^\kappa$ (FIG. 3(A)) and $V_1^\kappa - V_2^\kappa$ (FIG. 3(B)) are large. Accordingly, the variation in the calculated error Pr is small. On the other hand, when the interval $CA_1-CA_2$ is short, the both values $P_2 V_2^\kappa - P_1 V_2^\kappa$ and $V_1^\kappa - V_2^\kappa$ are small. Accordingly, there is a variation in the calculated error Pr. When the interval $CA_1-CA_2$ is extremely short, the value $V_1^\kappa - V_2^\kappa$ is almost zero and thus the variation is unfavorably large (FIG. 3(C)).

Therefore, in this embodiment, an adiabatic compression stroke period is separately calculated before the error Pr is calculated. When this adiabatic compression stroke period is shorter than a preset period, the error Pr is calculated by an equation (3) as described below, not by the above equation (2). Thus, even when the adiabatic compression stroke period is short, $P_{CPSDV}$ can be corrected to its absolute pressure while preventing the variation in the error Pr.

$$Pr=P_{IP}-P_{CPSDV(IS)} \quad (3)$$

In the above equation (3), $P_{IP}$ is a value detected by the intake pipe pressure sensor 38 when the intake valve 42 is opened. Also, $P_{CPSDV(IS)}$ is a value obtained based on a value detected by the CPS 30 when the intake valve 42 is opened. For example, $P_{CPSDV(IS)}$ may be a value detected by the CPS 30 at a predetermined crank angle when the intake valve 42 is opened, or an average value of values detected by the CPS 30 during the intake valve 42 is opened.

Figure 4:
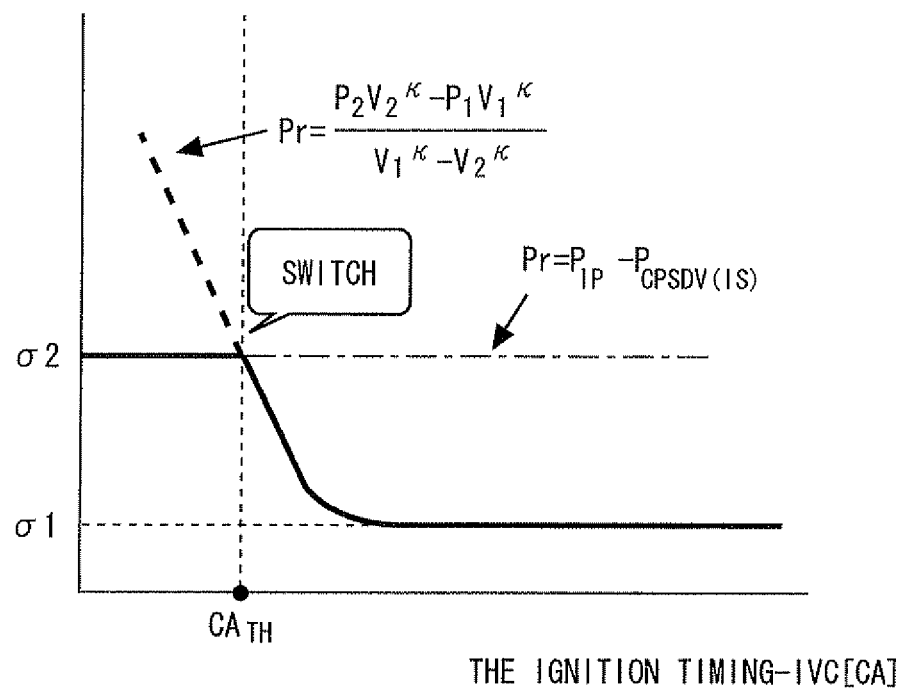
FIG. 4 is an illustration for explaining a threshold $CA_{TH}$ when the above equation (2) and the above equation (3) are switched to one another.

FIG. 4 is an illustration for explaining a threshold $CA_{TH}$ when the above equation (2) and the above equation (3) are switched to one another. In FIG. 4, the x axis represents the adiabatic compression stroke period (the ignition timing—IVC) and the y axis represents the variation in the error Pr (absolute pressure correction variation). As described above, the variation in the error Pr calculated by the above equation (2) becomes gradually larger from σ1 as the adiabatic compression stroke period is shorter. On the other hand, the variation in the error Pr calculated by the above equation (3) depends on the methods for calculating $P_{IP}$ and $P_{CPSDV(IS)}$. For example, the variation in the error Pr depends on an average value of square sum of the variation in $P_{IP}$ and the calculation variation in $P_{CPSDV(IS)}$. Accordingly, the variation sizes before and after the threshold $CA_{TH}$ are inverted. In this embodiment, the threshold $CA_{TH}$ is obtained by calculating a boundary value σ2 of the variation through a separate experiment or simulation, and is used as a determination value during switching control of calculation equations as described below. Incidentally, the threshold $CA_{TH}$ is stored in the ECU 60 in advance as data in a characteristics map defining a relationship between the adiabatic compression stroke period and the error Pr as shown in FIG. 4.

[Specific Processing of First Embodiment]

Figure 5:
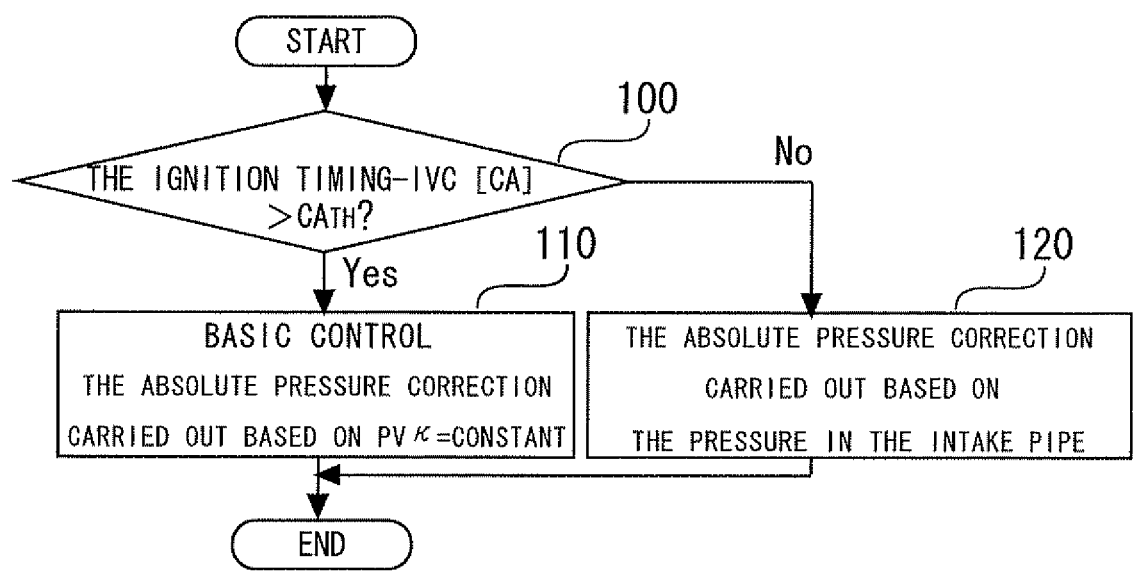
FIG. 5 is a flow chart showing the switching control of the calculation equations which is executed by the ECU 60 in this first embodiment.

Next, a specific processing for executing the above-described switching control of the calculation equations will be explained referring to FIG. 5. FIG. 5 is a flow chart showing the switching control of the calculation equations which is executed by the ECU 60.

Firstly, as a routine shown in FIG. 5, the ECU 60 compares the adiabatic compression stroke period of one cylinder 12 preceding another cylinder 12 to be corrected to its absolute pressure by a 1/n cycle (720°/n) with the threshold $CA_{TH}$ (step 100). Here, the adiabatic compression stroke period of the preceding cylinder 12 is obtained using the closing timing and the ignition timing of the intake valve 42 of the preceding cylinder 12 which is calculated separately and stored temporarily in the ECU 60. Also, data obtained by the method as explained above with reference FIG. 4 and stored in the ECU 60 in advance is used as the threshold $CA_{TH}$.

In the step 100, when the adiabatic compression stroke period is longer than the threshold $CA_{TH}$, the ECU 60 carries out the absolute pressure correction based on $PV^\kappa$=constant, i.e., the absolute pressure correction using the above equation (2) (step 110). On the other hand, when the adiabatic compression stroke period is shorter than the threshold $CA_{TH}$, the ECU 60 carries out the absolute pressure correction based on the pressure $P_{IP}$ in the intake pipe 32, i.e., the absolute pressure correction using the above equation (3) (step 120).

According to the flow shown in FIG. 5, the adiabatic compression stroke period of the preceding cylinder 12 and the threshold $CA_{TH}$ can be compared with each other and the calculation can be switched before calculating the error Pr. Thus, even when the engine 10 is controlled under such an operating condition that the adiabatic compression stroke period is short, the accuracy for the absolute pressure correction can be ensured.

Incidentally, in this embodiment, the intake pipe pressure sensor 38 corresponds to "intake pipe pressure acquiring means" according to the first aspect of the invention and the CPS 30 corresponds to "in-cylinder pressure acquiring means" according to the first aspect of the invention. In addition, the ECU 60 calculates the error Pr by the above equation (2) to provide "first corrected value calculating means" according to the first aspect of the invention, the ECU 60 calculates the error Pr by the above equation (3) to provide "second corrected value calculating means" according to the first aspect of the invention, the ECU 60 executes the processing in the step 100 as shown in FIG. 5 to provide "comparing means" according to the first aspect of the invention, and the ECU 60 executes the processing in the steps 110 and 120 to provide "in-cylinder pressure correcting means" according to the first aspect of the invention.

Incidentally, although the value detected by the intake pipe pressure sensor 38 is applied to the above equation (3) in this embodiment, for example, a value of the intake pipe pressure estimated by applying a crank angle CA detected by the crank angle sensor 22 and an intake air amount detected by the air flowmeter 34 to a well-known model. This modification is similarly applicable to later-described embodiments 2 and 3.

Second Embodiment

[Characteristics of Second Embodiment]

Next, a second embodiment of the present invention will be explained. In the second embodiment, the above equation (3) is corrected using a deviation ΔDV between mode values of the errors Pr calculated by the above equations (2) and (3) when a predetermined operating condition of the engine 10 is established in the system according to the first embodiment. Thus, the detailed description of the system structure is omitted.

In the first embodiment as described above, when a value of the error Pr calculated using the above equation (2) (hereinafter referred to as an error $Pr_{(2)}$) is widely varied, a value of the error Pr calculated using the above equation (3) (hereinafter referred to as an error $Pr_{(3)}$) is corrected into its absolute pressure. However, when the error Pr is calculated using the above equation (3), many sensors are necessary as compared to when the above equation (2) is used. Accordingly, the error $Pr_{(3)}$ may be unexpectedly varied. Especially, when the sensors deteriorate with the lapse of time, the variation in the error Pr is likely to be affected. At this time, the accuracy of calculating the error Pr is reduced even when the error $Pr_{(3)}$ is used.

In this embodiment, frequency distributions of the error $Pr_{(2)}$ and the error $Pr_{(3)}$ are obtained when the adiabatic compression stroke period is sufficiently long during the operation of the engine 10, and the above equation (3) is corrected based on the frequency distributions. As explained with reference to FIG. 3, the variation in the error $Pr_{(2)}$ is small when the adiabatic compression stroke period is sufficiently long. Accordingly, when a plurality of errors $Pr_{(2)}$ are obtained, a mode value $Pr_{(2)MV}$ in their frequency distributions is extremely close to a real error Pr. Therefore, a mode value $Pr_{(3)MV}$ of the error $Pr_{(3)}$ obtained when the adiabatic compression stroke period is sufficiently long is calculated, and the above equation (3) is corrected by their difference ΔDV ($=Pr_{(3)MV}-Pr_{(2)MV}$). Thus, the accuracy of calculating the error Pr can be ensured.

Specifically, first of all, the errors $Pr_{(2)}$ and the errors $Pr_{(3)}$ are respectively calculated every time when the adiabatic compression stroke period of the cylinder 12 to be corrected to the absolute pressure becomes a predetermined period$_{PDP1}$ (>the threshold $CA_{TH}$). The calculated errors $Pr_{(2)}$ and errors $Pr_{(3)}$ are sequentially stored in the ECU 60. Next, the ECU 60 calculates the mode value $Pr_{(2)MV}$ from the plurality of stored errors $Pr_{(2)}$. Similarly, the ECU 60 calculates the mode value $Pr_{(3)MV}$ from the errors $Pr_{(3)}$. Then, the ECU 60 calculates the deviation ΔDV of these values to convert the above equation (3) to an equation (4) as below.

$$Pr=P_{IP}-P_{CPSDV(IS)}-\Delta DV \qquad (4)$$

As explained above, the above equation (3) can be corrected to the above equation (4) in this embodiment. Accordingly, when the adiabatic compression stroke period is shorter than the threshold $CA_{TH}$, the error Pr can be calculated by using the above equation (4). Thus, the accuracy of calculating the error Pr can be improved. Especially, even when the sensors deteriorates with the lapse of time, the reduction in accuracy of the error $Pr_{(3)}$ during the absolute pressure correction can be compensated. Thus, the accuracy of calculating the error Pr can be maintained.

Incidentally, in this embodiment, the ECU 60 calculates the mode value $Pr_{(2)MV}$ to provide "first mode value calculating means" according to the second aspect of the invention, the ECU 60 calculates the mode value $Pr_{(3)MV}$ to provide "second mode value calculating means" according to the second aspect of the invention, and the ECU 60 calculates ΔDV to provide "mode value deviation calculating means" according to the second aspect of the invention.

The correction of the above equation (3) can be applied in the later-described third embodiment similarly to this embodiment.

Third Embodiment

[Characteristics of Third Embodiment]

Next, the third embodiment of the present invention will be explained below with reference to FIG. 6. In the third embodiment, the threshold $CA_{TH}$ is changed by using a deviation ΔSD which is a standard deviation between the errors Pr calculated by the above equations (2) and (3) when a predetermined operating condition of the engine 10 is established in the system according to the first embodiment. Thus, the detailed description of the system structure is omitted.

In the first embodiment as described above, the threshold $CA_{TH}$ is set in advance and is used as the determination value for switching the calculation equations. However, as described in the second embodiment, the error $Pr_{(3)}$ may be unexpectedly varied especially when the sensors deteriorate with the lapse of time. Accordingly, the accuracy of calculating the error Pr may be reduced even when the calculating equations are switched after the adiabatic compression stroke period and the threshold $CA_{TH}$ are compared with each other.

Thus, in this embodiment, when the adiabatic compression stroke period is sufficiently long during operation of the engine 10, the standard deviations of the error $Pr_{(2)}$ and the error $Pr_{(3)}$ are respectively obtained and then the threshold $CA_{TH}$ is changed. FIG. 6 is an illustration for specifically explaining a method for changing the threshold $CA_{TH}$ in this third embodiment. In FIG. 6, the x axis represents the adiabatic compression stroke period (the ignition timing—IVC) and the y axis represents the standard deviation of the error Pr.

Figure 6:
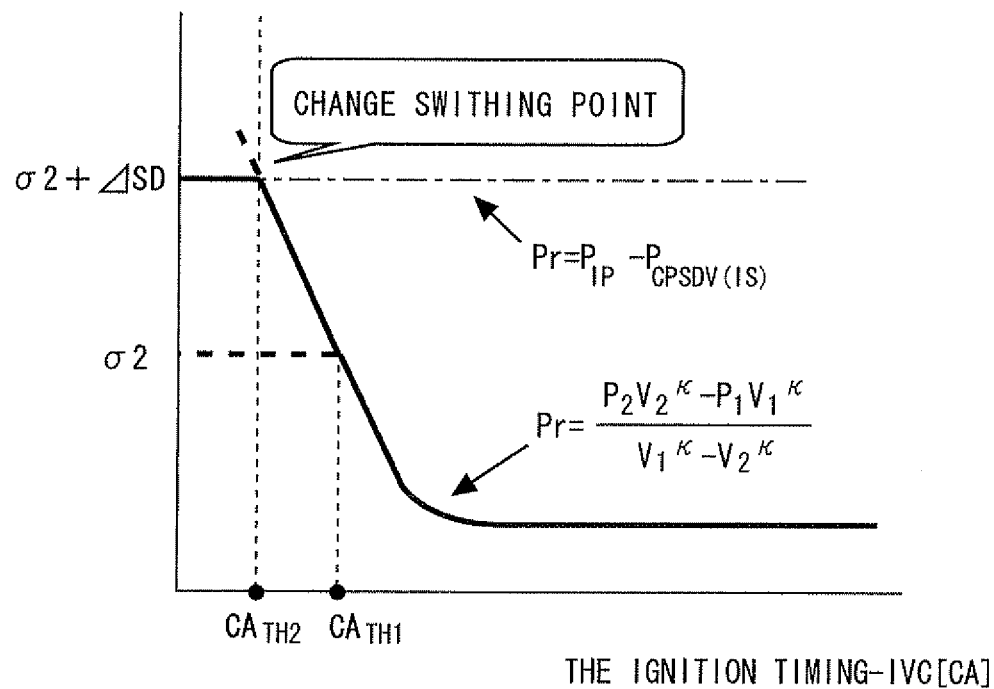
FIG. 6 is an illustration for specifically explaining a method for changing the threshold $CA_{TH}$ in this third embodiment.

A threshold $CA_{TH1}$ shown in FIG. 6 is an originally-set threshold. As explained with reference to FIG. 3, the variation (i.e., standard deviation $Pr_{(2)SD}$) of the error $Pr_{(2)}$ is small when the adiabatic compression stroke period is sufficiently long. Accordingly, the error $Pr_{(2)}$ is deemed equal to a real error Pr. Then, a difference ΔSD ($=Pr_{(3)SD}-Pr_{(2)SD}$) between the standard deviation $Pr_{(2)SD}$ as a reference and the standard deviation $Pr_{(3)SD}$ of the error $Pr_{(3)}$ corresponds to a gap from the standard deviation σ2 shown in FIG. 6. Thus, the accuracy of calculating the error Pr can be ensured by changing the threshold $CA_{TH1}$ to a threshold $CA_{TH1}$ corresponding to the standard deviation σ2+ΔSD.

More specifically, first of all, the errors $Pr_{(2)}$ and the errors $Pr_{(3)}$ are respectively calculated every time when the adiabatic compression stroke period of the cylinder 12 to be corrected to the absolute pressure becomes a predetermined period $CA_{PDP2}$ (>threshold $CA_{TH}$). The obtained errors $Pr_{(2)}$ and error $Pr_{(3)}$ are sequentially stored in the ECU 60. Next, the ECU 60 calculates the standard deviation $Pr_{(2)SD}$ from the plurality of stored errors $Pr_{(2)}$. Similarly, the ECU 60 calculates the standard deviation $Pr_{(3)SD}$ from the errors $Pr_{(3)}$. Then, the ECU 60 calculates a deviation ΔSD of these values to detect the threshold $CA_{TH2}$ corresponding to a standard deviation σ2+ΔSD from a characteristics map, and sets the threshold $CA_{TH2}$ as a new threshold. Incidentally, the characteristics map used in the first embodiment may be used in this embodiment.

As described above, the threshold $CA_{TH1}$ can be changed to the threshold $CA_{TH2}$ according to this third embodiment. Since the timing for switching the calculation equations can be appropriately selected, the accuracy of calculating the error Pr can be improved. Thus, the accuracy of calculating the error Pr can be maintained even when the sensors deteriorate with the lapse of time.

In this embodiment, the ECU 60 calculates the standard deviation $Pr_{(2)SD}$ to provide "first standard deviation calculating means" according to the third aspect of the invention, the ECU 60 calculates $Pr_{(3)SD}$ to provide "second standard deviation calculating means" according to the third aspect of the invention, the ECU 60 calculates ΔSD to provide "deviation of standard deviations calculating means" according to the third aspect of the invention, and the ECU 60 detects the threshold $CA_{TH2}$ from the characteristics map and sets it as a new threshold to provide "set period correcting means" according to the third aspect of the invention.

The invention claimed is:

1. A control device for an internal combustion engine comprising:
   intake pipe pressure acquiring means for acquiring an intake pipe pressure of the internal combustion engine;
   in-cylinder pressure acquiring means for acquiring an in-cylinder pressure of the internal combustion engine;
   first corrected value calculating means for acquiring in-cylinder pressures at least twice every required period after an intake valve of a cylinder of the internal combustion engine is closed and before mixture in the cylinder is ignited by ignition means of the cylinder while acquiring in-cylinder volumes during acquisition of the in-cylinder pressures, and calculating a first corrected value using the acquired in-cylinder pressures, the in-cylinder volumes, and a specific heat ratio;
   second corrected value calculating means for calculating a second corrected value using the in-cylinder pressure and the intake pipe pressure acquired when the intake valve is opened;
   comparing means for comparing the required period with a set period determined in advance; and
   in-cylinder pressure correcting means for correcting the in-cylinder pressures acquired within the required period using the first corrected value when the required period is longer than the set period, and correcting the in-cylinder pressures acquired within the required period using the second corrected value when the required period is shorter than the set period.

2. The control device for the internal combustion engine according to claim 1, further comprising:
   first mode value calculating means for calculating a first frequency distribution from data of the first corrected value calculated every predetermined timing within the required period when the required period is longer than the set period, and calculating a mode value of the first frequency distribution as a first mode value;
   second mode value calculating means for calculating a second frequency distribution from data of the second corrected value calculated the every predetermined timing and calculating a mode value of the second frequency distribution as a second mode value; and mode value deviation calculating means for calculating a deviation between the first mode value and the second mode value as a mode value deviation, wherein the in-cylinder pressures acquired within the required period are corrected by the in-cylinder pressure correcting means using the second corrected value and the mode value deviation when the required period is shorter than the set period.

3. The control device for the internal combustion engine according to claim 1, further comprising:

first standard deviation calculating means for calculating a standard deviation of the first frequency distribution as a first standard deviation;

second standard deviation calculating means for calculating a standard deviation of the second frequency distribution as a second standard deviation;

deviation of standard deviations calculating means for calculating a deviation between the first standard deviation and the second standard deviation as a deviation of standard deviations; and set period correcting means for correcting the set period using the deviation of standard deviations.

4. A control device for an internal combustion engine comprising:

an intake pipe pressure acquiring unit for acquiring an intake pipe pressure of the internal combustion engine;

an in-cylinder pressure acquiring unit for acquiring an in-cylinder pressure of the internal combustion engine;

a first corrected value calculating unit for acquiring in-cylinder pressures at least twice every required period after an intake valve of a cylinder of the internal combustion engine is closed and before mixture in the cylinder is ignited by ignition unit of the cylinder while acquiring in-cylinder volumes during acquisition of the in-cylinder pressures, and calculating a first corrected value using the acquired in-cylinder pressures, the in-cylinder volumes, and a specific heat ratio;

a second corrected value calculating unit for calculating a second corrected value using the in-cylinder pressure and the intake pipe pressure acquired when the intake valve is opened;

a comparing unit for comparing the required period with a set period determined in advance; and an in-cylinder pressure correcting unit for correcting the in-cylinder pressures acquired within the required period using the first corrected value when the required period is longer than the set period, and correcting the in-cylinder pressures acquired within the required period using the second corrected value when the required period is shorter than the set period.

5. The control device for the internal combustion engine according to claim 4, further comprising:

a first mode value calculating unit for calculating a first frequency distribution from data of the first corrected value calculated every predetermined timing within the required period when the required period is longer than the set period, and calculating a mode value of the first frequency distribution as a first mode value;

a second mode value calculating unit for calculating a second frequency distribution from data of the second corrected value calculated the every predetermined timing and calculating a mode value of the second frequency distribution as a second mode value; and a mode value deviation calculating unit for calculating a deviation between the first mode value and the second mode value as a mode value deviation, wherein the in-cylinder pressures acquired within the required period are corrected by the in-cylinder pressure correcting unit using the second corrected value and the mode value deviation when the required period is shorter than the set period.

6. The control device for the internal combustion engine according to claim 4, further comprising:

a first standard deviation calculating unit for calculating a standard deviation of the first frequency distribution as a first standard deviation;

a second standard deviation calculating unit for calculating a standard deviation of the second frequency distribution as a second standard deviation;

a deviation of standard deviations calculating unit for calculating a deviation between the first standard deviation and the second standard deviation as a deviation of standard deviations; and a set period correcting unit for correcting the set period using the deviation of standard deviations.

* * * * *